May 17, 1966  G. W. SEULEN  3,252,014
SWITCHING DEVICE WITH ARC SUPPRESSOR
Filed May 17, 1963  2 Sheets-Sheet 1
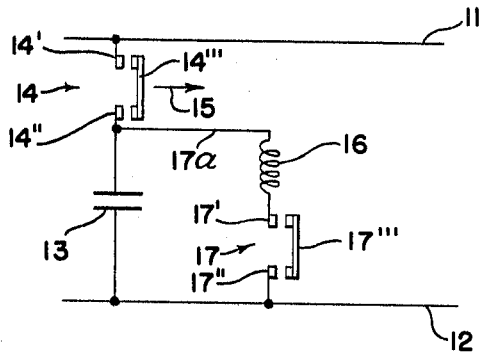
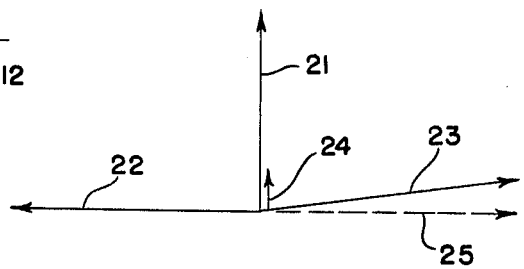
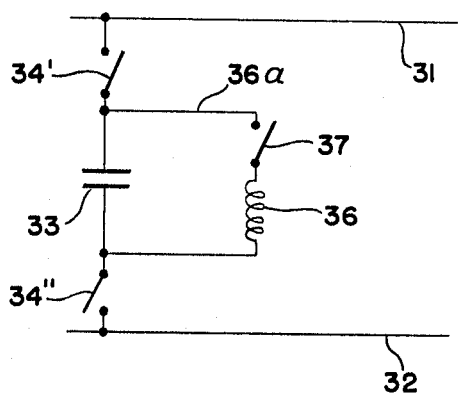
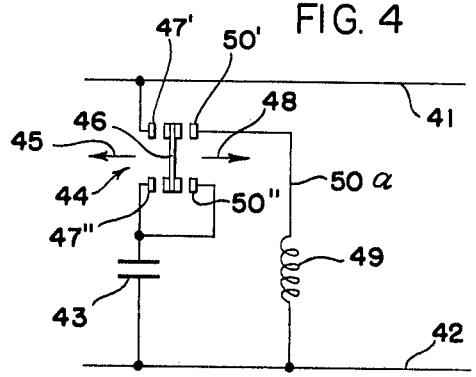
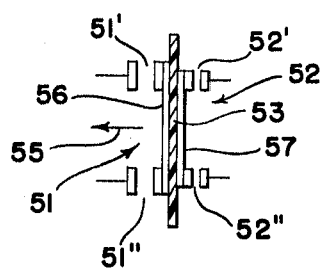
INVENTOR.
GERHARD W. SEULEN
BY
Tilbery & Body
ATTORNEYS May 17, 1966  G. W. SEULEN  3,252,014
SWITCHING DEVICE WITH ARC SUPPRESSOR
Filed May 17, 1963  2 Sheets-Sheet 2

INVENTOR.
GERHARD W. SEULEN
BY

ATTORNEYS

United States Patent Office 3,252,014
Patented May 17, 1966

3,252,014
SWITCHING DEVICE WITH ARC SUPPRESSOR
Gerhard W. Seulen, Hammesberger Strasse 31,
Remscheid-Hasten, Germany
Filed May 17, 1963, Ser. No. 281,278
14 Claims. (Cl. 307—136)

The present invention is directed toward the art of switching devices and more particularly to a switching device provided with means for suppressing an arc between the circuit breakers of the device.

The present invention is particularly applicable to a switching device for selectively connecting and disconnecting a predominantly capacitive reactance component, such as a capacitor, across a high frequency source of alternating current and it will be discussed with particular reference thereto; however, it is to be appreciated that the invention has much broader applications and may be used in a switching device for selectively connecting and disconnecting a variety of components across a source of alternating current.

The term "high frequency" as herein used refers to a frequency substantially greater than the frequency of the incoming power lines.

It is common knowledge that a switching device for connecting and disconnecting capacitive reactance components, such as capacitors, especially when the component is connected across a high frequency source, presents special problems because the arc between the circuit breaker contacts does not have a sufficient time to de-ionize before the current across the contact gap swings in the opposite direction to a voltage sufficient to re-establish the arc. This problem of extinguishing the arc between the circuit breaker contacts of the high frequency switching device is especially important when the component being disconnected by the switching device is of such a character that the current across the component is substantially out of phase with the component voltage. Consequently, this problem is of particular significance when a pure reactance, such as a condenser, is connected across the high frequency source. This arcing of the circuit breaker within the switching device causes rapid deterioration of the circuit breaker contacts and other harmful effects.

It is known to provide a switching device with a main circuit breaker and an auxiliary circuit breaker to divide the switching process into two distinct steps. It is also known to provide a coil adjacent the circuit breaker within the switching device and connecting the coil across the circuit breaker so that the switching current can pass through the coil and generate a magnetic field for blowing out the arc at the circuit breaker contacts. These known devices have not proven satisfactory especially at the higher frequencies. For instance, extreme difficulties are realized when the frequency of the current across the component being controlled by the switching device is in the range of 1,000 to 10,000 cycles per second.

It is also known that an impedance coil which can be biased or selectively saturated with a direct current can be shunted around a condenser connected across a source of current in the middle frequencies. With such an arrangement, the impedance of the coil is controlled by the amount of direct current bias of the coil. This solution to the problem of arcing across the circuit breaker of a switching device has proven satisfactory in operation; however, it has posed serious limitations. For instance, the impedance coil controlled by a direct current source is very expensive and requires a substantial amount of space adjacent the switching device since such a coil is designed to pass a full continuous line current. In addition, the auxiliary switching equipment associated with such an impedance coil must be designed for handling a continuous current which not only increases the size of the switching equipment but also increases the cost of the switching device. Further, to safeguard against inadvertent switching of the auxiliary equipment, such an arrangement requires additional components which also increases the space required and the cost of the equipment.

These and other disadvantages have been completely overcome by the present invention which is directed toward a switching device that prevents arcing between the circuit breaker contacts which device is positive in operation and requires a substantially reduced space than known devices. In accordance with the present invention there is provided a switching device for switching a reactive component connected across a high frequency alternating current source and having a main circuit breaker in series with the component and an auxiliary circuit breaker in a shunt circuit which shunt circuit is provided with an auxiliary reactance which is so dimensioned to substantially balance the reactance of the component being controlled. The arc between the contacts of the circuit breaker is prevented by closing the auxiliary circuit breaker to connect the shunt circuit and the controlled component so that the current across the main circuit breaker is reduced.

An especially important aspect of the present invention is that both the auxiliary circuit breaker and the shunt or auxiliary reactance are required to carry current only while a sparking current is available across the contacts of the main circuit breaker. When this current is substantially reduced by the action of the shunt or auxiliary reactance and the controlled component, the auxiliary circuit breaker and the auxiliary reactance connected in series are automatically isolated from the high frequency power source. Accordingly, it is possible to use both the auxiliary circuit breaker and the auxiliary reactance for only an extremely short period so that the cost and the dimensions of this equipment is relatively minor.

According to the present invention, the device is advantageously used for connnecting and disconnecting a capacitor across the high frequency power supply and the shunt reactance is required to have only a sufficient inductive reactance that when connected in series with the controlled capacitor, the reactance of the shunt circuit reduces the current across the main circuit breaker to a level which is not sufficient to sustain an arc across the contacts.

In accordance with a more specific aspect of the present invention, there is provided a device for disconnecting a reactance component from across a source of alternating current comprising a first switch means in electrical series with the component, an arc suppressor circuit shunted around the component, a reactance balancing element in the shunt circuit; the balancing element having a reactance of such a value to substantially balance the component, a second switch in the shunt circuit and means for closing the second switch immediately after the first switch is opened to suppress an arc at the first switch.

The primary object of the present invention is the provision of a switching device for controlling a predominantly capacitive component across the high frequency power supply and having a main circuit breaker and a means for suppressing the arcing across the circuit breaker contacts when the component is disconnected from the power supply which device is relatively inexpensive and requires very little mounting space.

Still a further object of the present invention is the provision of a device as defined above which device has a shunt circuit and a balancing reactance element in the shunt circuit to prevent an arcing current at the circuit breaker.

Still another object of the present invention is the provision of a switching device for controlling a predominantly capacitive component as defined above which device has a shunt circuit and a balancing reactance in the shunt circuit with the current flowing in the shunt circuit only when an arcing current is present at the circuit breaker.

Still another object of the present invention is the provision of a switching device as defined above which device uses a combination of current reduction by a reactive shunt circuit and a magnetic blow-off to prevent arcing at the circuit breaker of the switching device.

These and other objects and advantages will become apparent from the following description used to illustrate the preferred embodiment of the present invention as read in connection with the accompanying drawings in which:

FIGURE 1 is a wiring diagram illustrating one embodiment of the present invention;

FIGURE 2 is a vector diagram representing the operation of the circuit illustrated in FIGURE 1;

FIGURE 3 is a wiring diagram illustrating a modification of the present invention;

FIGURE 4 is a circuit diagram illustrating another modification of the present invention;

FIGURE 5 is an enlarged, somewhat schematic, view illustrating a modification of the circuit breaker in the circuit illustrated in FIGURE 4;

Figure 6:
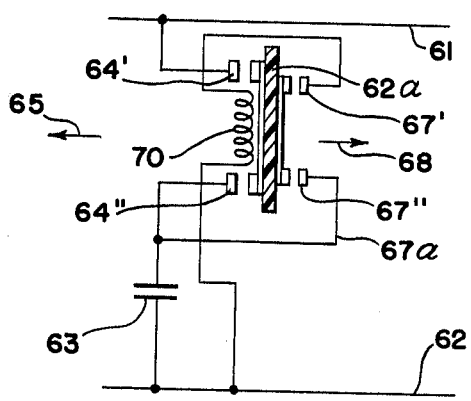
FIGURE 6 is a wiring diagram illustrating a further modification of the present invention.

Referring now to the drawings, wherein the showings are for the purpose of illustrating a preferred embodiment of the invention only and not for the purpose of limiting same, FIGURE 1 shows a switching device interposed between power lines 11–12 for connecting and disconnecting a highly reactive component, which in this embodiment of the present invention is a capacitor 13. The power line may be connected to a single phase generator, a static frequency multiplier or another device for supplying high frequency current which current passes through capacitor 13 when the capacitor is connected across the power lines. The capacitor is connected through the main circuit breaker 14 having contacts 14′ and 14″ which are connected by conductive bridge 14‴. To disconnect the capacitor 13 from across the power lines 11, 12, the bridge 14‴ is moved in the direction indicated by arrow 15. Without any other structure, a spark would often be created between the contacts 14′ and 14″ and the bridge 14‴ when the bridge was shifted to open the circuit breaker 14. The present invention is directed toward an arrangement for preventing such sparking at the circuit breaker 14 and this arrangement comprises an auxiliary circuit breaker 17 having contacts 17′ and 17″ and a conductive bridge 17‴ so that the shunt circuit 17a can be opened and closed in response to movement of the bridge 17‴ into and out of engagement with contacts 17′ and 17″. In the shunt circuit 17a there is provided a coil 16 having an inductive reactance of such a value to substantially balance the capacitive reactance of capacitor 13. Accordingly, immediately after closing circuit breaker 17, any arc created at circuit breaker 14 is extinguished because the resulting current value after connecting capacitor 13 in series with coil 16 is of such low value that it cannot sustain the arc.

It is appreciated that the invention includes the concept of closing circuit breaker 17 before the circuit breaker 14 has been opened. By this sequence of operation, the current at contacts 14′ and 14‴ is lowered before the contacts actually open; however, the circuit breaker 17 must be so controlled that it does in fact open immediately thereafter.

Referring now to FIGURE 2, there is a vector diagram illustrating the operation of the switching device as disclosed in FIGURE 1. The voltage of the high frequency source across lines 11, 12 is shown in vector 21. Vector 22 is the current flowing through the capacitor 13 when the circuit breaker 14 is closed and vector 23 is the current which flows through the coil 16 when the auxiliary circuit breaker 17 is closed. This current 23 is the resulting current of pure resistance current 24 and pure inductive reactance current 25. The current 25 compensates for the current 22 so that the current at the open circuit breaker 14 is reduced from the value represented by vector 22 to the value represented by vector 24. At the same time this current 24 is substantially in phase with the voltage 21 and the arc is immediately extinguished because such current does not have a sufficiently high magnitude to maintain ionization between the spaced contacts.

Accordingly, in operation, the main circuit breaker 14 is opened and immediately thereafter the auxiliary circuit breaker 17 is closed so that the inductive reactance of coil 16 substantially balances the capacitive reactance of capacitor 13 to prevent a substantial amount of current flow through any arc established between the contacts of the main circuit breaker. It is obvious, that after the current from capacitor 13 is dissipated by coil 16, there is substantially no current flow through the coil 16 and circuit breaker 17 so that these components can have a rather small continuous current rating since they are subjected only momentarily to high current flow.

Referring now to FIGURE 3, there is illustrated a further embodiment of the present invention wherein the power lines 31, 32 are connected to an appropriate power supply that furnishes current to capacitor 33 through main circuit breakers 34′ and 34″, which are illustrated as single throw, single pull switches. A coil 36 is connected in shunt circuit 36a which also includes an auxiliary circuit breaker 37 which is similar to the circuit breaker 17 of FIGURE 1. The operation of this modification of the present invention is somewhat similar to the operation of the embodiment disclosed in FIGURE 1. When the main circuit breakers 34′ and 34″ are opened, the auxiliary circuit breaker 37 is immediately closed to shunt the capacitor 33 by coil 36 which reduces the current flow across any arc established at the contacts of the main circuit breaker so that these arcs are easily extinguished.

Referring now to FIGURE 4, there is illustrated a further embodiment of the present invention somewhat similar to the embodiment illustrated in FIGURES 2 and 3 wherein a capacitor 43 is connected across power lines 41, 42 by a main circuit breaker 44 having main contacts 47′ and 47″ and auxiliary contacts 50′ and 50″. Movable between the main and auxiliary contacts of the circuit breaker 34 is a conductive bridge 46 which establishes electrical continuity between contacts 47′, 47″ or contacts 50′, 50″. When the bridge 46 is in engagement with contacts 50′, 50″ the shunt circuit 50a is connected across the capacitor 43 in a manner similar to the shunt circuits 17a, 36a of FIGURES 1 and 3 respectively.

Upon movement of the bridge 46 in the direction of arrow 48, the shunt circuit 50a is established to connect the coil 49 in series with the capacitor 43 and to thus extinguish any arcs tending to be established between contacts 47′ and 47″. When moving the bridge 46 in the direction of arrow 45, the shunt circuit is first disconnected and then the capacitor 43 is connected across leads 41, 42. This development is particularly advantageous because the switching bridge 46 is actuated by the switch operating mechanism, not shown, in such a way that the auxiliary contacts 50′ and 50″ close immediately after opening the main contacts 47' and 47". Consequently, there is provided a convenient arrangement for sequentially operating the main and auxiliary circuit breakers. By the provision of a single bridge for controlling the separate circuit breakers, there is no possibility of connecting the capacitor across line 41, 42 without first disconnecting the shunt circuit 50a.

Referring now to FIGURE 5, there is illustrated a special embodiment of a switch bridge for alternately connecting a set of main contacts 51' and 51" and a set of auxiliary contacts 52' and 52". In accordance with this modification of the present invention, the bridge 56 for the main contacts is insulated from the bridge 57 for the auxiliary contacts by an intermediate body 53 of insulating material. When moving body 53 in the direction of arrow 55, the main contacts 51 are closed after the auxiliary contacts 52 are opened. Because of the extremely small current in the shunt circuit of the switching devices constructed in accordance with the present invention, there is no necessity for providing high current ratings of the auxiliary contacts 52 and, for this reason, the contacts 52' and 52" and the bridge therebetween are of rather light electrically conductive material.

In many installations, the auxiliary circuit breakers can be placed in another area of the switch equipment so that it is separated from the main switch by a considerable distance.

Although the illustrated embodiment of the present invention as shown in FIGURES 1–4 have been adapted for controlling a capacitor, it is appreciated that the switching device, constructed in accordance with the present invention, could be conveniently used for switching or otherwise controlling a highly inductive component, such as a loading coil. In this case, the auxiliary reactance would be a capacitive reactance of such a value that after connecting the auxiliary reactance with the controlled inductive reactance, the current attempting to establish or maintain an arc across the contacts of the main circuit breaker would be of such little value that such an arc would be extinguished.

The shunted capacitive reactance could have a relatively small current capacity since there is only a very short duration of current flow through the shunt circuits. Further, the auxiliary circuit breaker could also be made of very little and inexpensive material.

According to a further development of the present invention, the switching device is so constructed that the coil forming the shunt circuit inductive reactance is positioned adjacent the main circuit breaker contacts so that a magnetic blow-off of any arc can be accomplished directly after the shunt coil is connected across the highly capacitive component. Such an arrangement is shown in FIGURE 6 wherein capacitor 63 is connected across power lines 61 and 62 by a main circuit breaker having contacts 64' and 64". The capacitor is across the power lines when the contact bridge 62a is moved in the direction of arrow 65. When the bridge 62a is shifted in the opposite direction indicated by arrow 68, the bridge 62a joins auxiliary contacts 67' and 67" to connect the shunt circuit 67a.

Within the shunt circuit there is provided a coil 70 having the proper amount of inductive reactance to substantially balance the capacitive reactance of capacitor 63 so that when the shunt circuit is connected across the capacitor, the current across the main contacts is not sufficient to sustain an arc thereat. The coil is so positioned with respect to the contacts that a magnetic field is created when a current flows through the coil and the magnetic field is so oriented that any arc created across the main contacts 64' or 64" will be immediately blown away by the magnetic field. The ampere-turns of the coil 70 have an extremely high instantaneous value so that even under the most unfavorable conditions, for example when the frequency of the power lines is in the vicinity of 10,000 cycles per second, or more, the arc at the main contact is instantaneously blown away. Since the blowing effect caused by coil 70 is caused only by the short duration current flow when the shunt circuit is first engaged, the blowing effect of the coil is substantially independent of the size of the main current flowing through the capacitor 63 prior to disengagement of the main circuit breaker.

Accordingly, the shunt circuit causes a reduction in voltage across the main circuit breaker and also causes a magnetic blow-off which two functions assure that the arc at the main contacts is extinguished.

Figure 7:
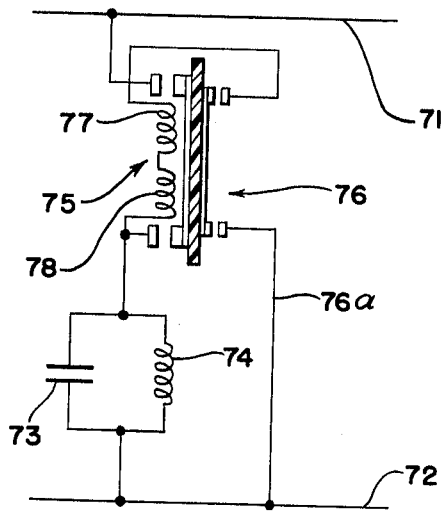
FIGURE 7 is another wiring diagram illustrating still a further modification of the present invention.

Referring now to FIGURE 7, there is shown a further embodiment of the present invention wherein the main component comprises a capacitor 73 and a coil 74, such as is found in an oscillator circuit, which component is both inductive and capacitive in nature and is connected across the power lines 71, 72 by the main circuit breaker 75. By opening the main circuit breaker 75 and then closing the auxiliary circuit breaker 76, the shunt circuit 76a is connected across the highly reactive component so that the coils 77, 78 are in series with the parallel arranged capacitor 73 and coil 74. The ampere-turns of coils 77, 78 are sufficiently great to cause magnetic blow-off of any arc tending to form on the contacts of the main circuit breaker 75.

It is noted that the shunt circuit 76a is not connected across the power lines 71, 72 and it must only be designed to accept a short duration of high current flow which current flow multiplied by the number of windings of the coils 77, 78 effectively blow-off the arcs at the contacts of main circuit breaker 75. Thus, the components of the shunt circuit may have a low continuous current rating.

Figure 8:
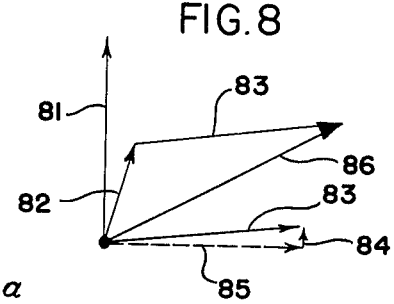
FIGURE 8 is a vector diagram showing the operation of the modification illustrated in FIGURE 7.

Referring now to FIGURE 8, there is shown in vector diagram illustrating the operation of the embodiment of the present invention shown in FIGURE 7. Vector 81 represents the voltage across the power lines 71, 72 and the vector 82 represents the current flowing through the combinaiton of capaictor 73 and coil 74. It is noted that this current is slightly lagging the voltage which would indicate that the controlled component is more inductive than capacitive. At the disconnection of the circuit breaker 75, the current represented by vector 82 flows over the contact points of the main circiut breaker and when the auxiliary circiut breaker 76 is connected, this current is increased by the current through coils 77, 78 represented by vector 83. When the coils of the shunt circuit are connected across the controlled component, the resulting current is represented by vector 86 and the current flowing through the coils 77, 78 multiplied by the number of turns of the coils determines the blowing effect caused by these coils. The current 83 through the coils is determined by a resistance vector 84 and an inductance vector 85. The number of windings in the coils is such that a sufficient blowing action takes place.

Figure 9:
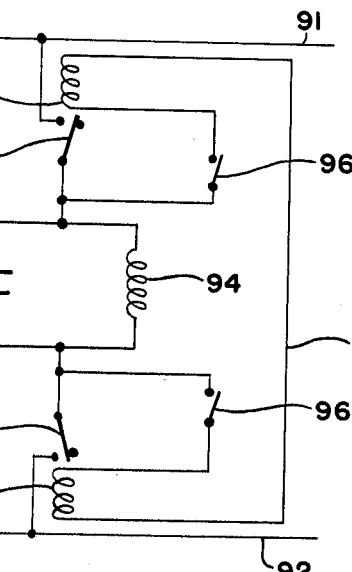
FIGURE 9 is still another wiring diagram illustrating the further modification of the present invention.

Referring now to FIGURE 9, there is illustrated a further embodiment of the present invention which is somewhat similar to the embodiment shown in FIGURE 3 and the embodiment shown in FIGURE 7. The controlled component is formed from capacitor 93 and coil 94 and is connected across power lines 91, 92 by appropriate main circuit breakers 95', 95" which circuit breakers are located in series on opposite sides of the main component. Auxiliary circuit breakers 96' and 96" are adapted to be closed so that the shunt circuit 96a is adapted to be connected across the main component comprising capacitor 93 and coil 94. Within the shunt circuit there are provided blowing coils 97' and 97" each of which is positioned adjacent main circuit breakers 95' and 95" respectively.

The operation of this arrangement is self explanatory, the main circuit breakers are opened and immediately thereafter the axuliary circuit breakers are closed which causes a balancing effect if the controlled component is predominantly capacitive and also causes a blowing action at the contacts. It is noted that the shunt circuit 96a is not connected across the main power lines 91, 92 and only a short duration of current flow is necessary for the actuation of the shunt circuit. It is within the contemplation of the invention to incorporate a balancing capacitor within the shunt circuit 92a if the inductive reactance of the main component so requires.

In accordance with another aspect of the present invention, the switching device constructed in accordance with the teachings of FIGURES 4, 6, 7 can be mounted on electrically conductive plates which plate is in turn screwed or otherwise secured to an appropriate bus bar to effect a mechanical fastening at the same time as the electrical connection is made. Further, the direction of blowing of the blowing coils may be varied in accordance with the desired blowing results.

It is also appreciated that the coils in the shunt circuit may be provided with an adjustable iron or molded core so that their inductive reactance can be varied in accordance with the capacitive reactance of the main component. Further, suitable shaping of these cores may be provided for improving the blowing effect thereof.

The present invention has been discussed in connection with certain structural embodiments; however, it is appreciated that various changes may be made without departing from the intended spirit and scope of the present invention as defined by the appended claims.

Having thus described my invention, I claim:

1. A device for disconnecting a highly reactive component from across a source of alternating current comprising a first switch means in electrical series with said component, an arc suppressor circuit shunted around said component, a balancing reactance element in said shunt circuit, said balancing element having a reactance of such a value to substantially balance the reactance of said component, a second switch means in said shunt circuit and means for closing said second switch means at least immediately after said first switch means is opened to suppress an arc at said first switch means.

2. A device as defined in claim 1 wherein said component is predominantly a capacitive reactance component and said balancing element is predominantly an inductive reactance element.

3. A device as defined in claim 1 wherein said component is predominantly an inductive reactance component and said balancing element is predominantly a capacitive reactance element.

4. A device as defined in claim 1 wherein said main switch means comprises a first and second circuit breaker and said circuit breakers being located on opposite sides of said component; and said circuit breakers being located between said source and said shunt circuit.

5. A device as defined in claim 1 wherein said first switch means comprises a first contact and said second switch means comprises a second contact, a conductive member, means for moving said conductive member selectively between a first position in engagement with said first contact and a second position in engagement with second contact.

6. A device as defined in claim 1 wherein said first switch means comprises a first contact, said second switch means comprises a second contact, a first conductive member for contacting said first contact, a second conductive member for contacting said second contact, a movable insulation member for joining said conductive members, and means for moving said insulation member from a first position with said first member contacting said first contact to a second position with said second member contacting said second contact.

7. A device as defined in claim 6 wherein said second member has a lower continuous current rating than said first member.

8. A device as defined in claim 1 wherein said second switch means has a lower continuous current rating than said first switch means.

9. An apparatus as defined in claim 1 wherein said reactance element has a lower continuous current rating than said component.

10. A device as defined in claim 1 wherein said reactance element is a coil mounted adjacent said first switch means, said coil having sufficient turns to cause a magnetic blowing action on an arc formed at said first switching means.

11. A device for disconnecting a highly reactive component from across a source of alternating current comprising a first switch means in series with said component, a circuit shunting only said component, a second switch means in said shunt circuit, a coil in said shunt circuit, said coil being adjacent said first switch means and having a sufficiently high number of turns to extinguish an arc at said first switch means when a current flows through said coil, and means for closing said second switch means at least immediately after said first switch means is opened.

12. A device as defined in claim 11 wherein said coil has a continuous current rating substantially less than the continuous current rating of said component.

13. A device as defined in claim 11 wherein said component is predominantly capacitive reactance and said coil has an inductive reactance of such a value to substantially balance the reactance of said component.

14. A device as defined in claim 11 wherein said source is a high frequency source.

No references cited.

ORIS L. RADER, *Primary Examiner.*

W. M. SHOOP, *Assistant Examiner.*